(12) United States Patent
Azizi

(10) Patent No.: US 11,126,690 B2
(45) Date of Patent: Sep. 21, 2021

(54) MACHINE LEARNING ARCHITECTURE SUPPORT FOR BLOCK SPARSITY

(71) Applicant: Intel Corporation, Santa Clara, CA (US)

(72) Inventor: Omid Azizi, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 16/370,094

(22) Filed: Mar. 29, 2019

(65) Prior Publication Data

US 2020/0311181 A1    Oct. 1, 2020

(51) Int. Cl.
*G06F 17/16* (2006.01)
*G06N 20/00* (2019.01)
*G06F 9/30* (2018.01)
*G06F 9/38* (2018.01)

(52) U.S. Cl.
CPC ............ *G06F 17/16* (2013.01); *G06F 9/3001* (2013.01); *G06F 9/3016* (2013.01); *G06F 9/30036* (2013.01); *G06F 9/3802* (2013.01); *G06N 20/00* (2019.01)

(58) Field of Classification Search
CPC ..... G06F 17/16; G06F 9/3001; G06F 9/30036
See application file for complete search history.

(56) References Cited

U.S. PATENT DOCUMENTS

| 9,454,472 B2 * | 9/2016 | Reinwald ............ G06F 12/0223 |
| 10,275,479 B2 * | 4/2019 | Zhao ........................ G06F 16/22 |
| 10,489,063 B2 * | 11/2019 | Mishra ................ G06F 9/30036 |
| 2011/0307685 A1 | 12/2011 | Song |
| 2014/0108481 A1 | 4/2014 | Davis et al. |
| 2015/0067009 A1 | 3/2015 | Strauss et al. |
| 2019/0042237 A1 | 2/2019 | Azizi et al. |
| 2019/0347555 A1 * | 11/2019 | Park ...................... G06N 3/063 |

FOREIGN PATENT DOCUMENTS

| EP | 3343383 A1 | 4/2018 |
| WO | 2019008661 A1 | 1/2019 |

OTHER PUBLICATIONS

Extended European Search Report for EP Application No. 20159725.9 dated Sep. 1, 2020.
U.S. Appl. No. 16/230,814, filed Dec. 21, 2018, Azizi et al.

* cited by examiner

*Primary Examiner* — Michael D. Yaary
(74) *Attorney, Agent, or Firm* — Fletcher Yoder P.C.

(57) ABSTRACT

This disclosure relates matrix operation acceleration for different matrix sparsity patterns. A matrix operation accelerator may be designed to perform matrix operations more efficiently for a first matrix sparsity pattern rather than for a second matrix sparsity pattern. A matrix with the second sparsity pattern may be converted to a matrix with the first sparsity pattern and provided to the matrix operation accelerator. By rearranging the rows and/or columns of the matrix, the sparsity pattern of the matrix may be converted to a sparsity pattern that is suitable for computation with the matrix operation accelerator.

20 Claims, 9 Drawing Sheets

US 11,126,690 B2

MACHINE LEARNING ARCHITECTURE SUPPORT FOR BLOCK SPARSITY

BACKGROUND

This disclosure relates generally to the field of data processing and, more particularly, to matrix operation acceleration for different matrix sparsity patterns.

This section is intended to introduce the reader to various aspects of art that may be related to various aspects of this disclosure, which are described and/or claimed below. This discussion is believed to be helpful in providing the reader with background information to facilitate a better understanding of the various aspects of this disclosure. Accordingly, it should be understood that these statements are to be read in this light, and not as admissions of prior art.

Machine learning (ML) has become increasingly valuable in a number of technical fields. For example, machine learning may be used in natural language processing, image processing, computer vision, such as object recognition, bioinformatics, and economics, among other fields and applications. Deep learning (DL), which is a subset of machine learning, may use a number of inference computations in a neural network to deliver prediction data for use in suitable fields and applications, such as those listed above. Further, the growth of neural networks in deep learning and/or growth of machine learning applications may result in increased amounts of data and inference computations. However, these training and/or inference computations may include a number of matrix multiplication operations (e.g., general matrix multiplication (GeMM) operations), such as dot-product computations, which may consume significant area, power, and routing resources of a computer architecture and/or may introduce latency to computations.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
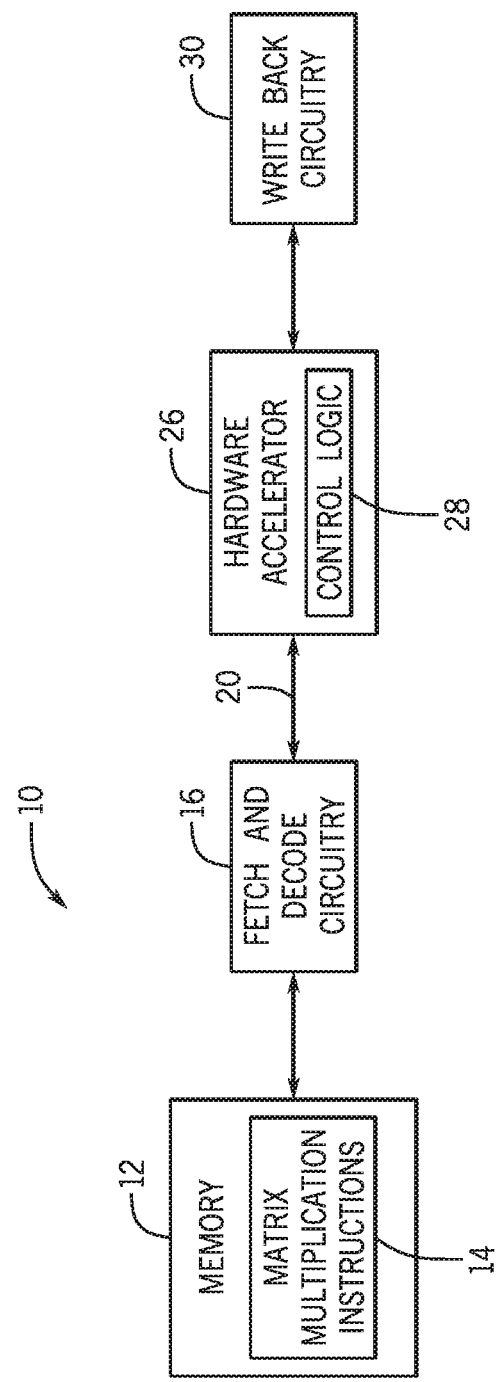
FIG. 1 is a block diagram of a system for implementing matrix operations, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of this disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of this disclosure are not intended to be interpreted as excluding the existence of additional embodiments that also incorporate the recited features. Furthermore, the phrase A "based on" B is intended to mean that A is at least partially based on B.

This disclosure relates generally to a data processing system implemented to efficiently perform operations, such as matrix operations, that may be associated with machine learning (ML) applications, deep learning (DL) applications, and/or the like. For example, this disclosure relates to techniques for matrix multiplication acceleration for different matrix sparsity patterns. As described herein, "sparsity" refers to the proportion of non-zero elements to remaining elements (e.g., zero and/or null elements) in a matrix. Moreover, in some embodiments, a matrix operation accelerator (e.g., a hardware accelerator implemented in an application-specific integrated circuit (ASIC), a hardware accelerator implemented in a programmable logic device, such as a field programmable gate array, a software matrix accelerator) may process of a certain set of sparsity patterns, such as unstructured sparsity (e.g., fine-grained sparsity) or structured sparsity (e.g., block-sparsity). In some cases, the matrix operation accelerator may only operate on a specific type of sparsity patterns, (e.g., only fine-grained sparsity or only structured sparsity). In other cases, the matrix operation accelerator may be capable of operating on multiple types of sparsity patterns, but may be more efficient with certain sparsity patterns (e.g., more efficient with fine-grained sparsity or more efficient with structured sparsity). For example, the matrix operation accelerator may be implemented to reduce and/or optimize the computations involved with a matrix operation (e.g., matrix multiplication, general matrix multiplication (GeMM), and/or the like) based at least in part on the detection and/or prediction of the number and/or location of the zero and/or null elements in matrix input to the matrix operation. As such, the power, time (e.g., latency), and/or resources (e.g., hardware or software resources) involved with computing the matrix operation may be reduced.

However, in some embodiments, hardware optimizations suitable for a first sparsity pattern may not be suitable for a second sparsity pattern. For example, techniques and/or hardware used to accelerate matrix multiplication of matrices with unstructured sparsity may vary from the techniques and/or hardware used to accelerate matrix multiplication of matrices with structured sparsity. Moreover, different inference and/or deep learning models may use different sparsity patterns to maintain a particular level of accuracy. As such, a matrix operation accelerator designed (e.g., optimized) to perform matrix operations on a matrix with an unstructured sparsity pattern corresponding to a first deep learning model may be less capable or efficient when performing matrix operations on a matrix with a structured sparsity pattern corresponding to a second deep learning model. As used herein, a matrix operation accelerator that is "designed" or "optimized" for performing matrix operations on matrices of one or more particular sparsity patterns may provide better performance (e.g., speed, power, and/or the like) during the matrix operations on the matrix with the unstructured sparsity pattern than during the matrix operations on the matrix with the structured sparsity pattern. For example, a matrix operation accelerator may be designed (e.g., optimized) to provide better performance (e.g., speed, power, and/or the like) during the matrix operations on the matrix with the unstructured sparsity pattern than during the matrix operations on the matrix with the structured sparsity pattern.

Accordingly, this disclosure describes techniques in which a matrix operation accelerator designed to best operate on a matrix with a first sparsity pattern (e.g., unstructured and/or fine-grained sparsity) may operate substantially as capably or efficiently on a matrix with a second sparsity pattern (e.g., structured and/or block sparsity). Indeed, software or the matrix operation accelerator may identify and/or convert a matrix with the second sparsity pattern into a matrix with the first sparsity pattern (e.g., unstructured and/or fine-grained sparsity). In this way, a matrix operation accelerator that has been designed to best operate on matrices having the first sparsity pattern may also operate capably and/or efficiently on matrices having the second sparsity pattern without having to redesign the matrix operation accelerator or cause it to operate in a different matrix operation accelerator mode that may be less capable and/or less efficient.

For example, in some embodiments, the rows and/or columns of a matrix—which may represent elements of an artificial intelligence (AI) or machine learning (ML) application—may be rearranged (e.g., scrambled) as they are read from memory and/or provided to the matrix operation accelerator to produce a rearranged matrix such that the sparsity pattern of the rearranged matrix is different from the sparsity pattern of the matrix stored in memory. Moreover, in some embodiments, by rearranging the rows and/or columns of the matrix, the sparsity pattern of the matrix may be converted to a sparsity pattern that is more suitable for a particular matrix operation accelerator. For instance, the matrix operation accelerator may be designed (e.g., optimized) to perform matrix operations on matrices with a fine-grained sparsity pattern. As such, by rearranging the rows and/or columns of matrix with a block sparsity pattern, a rearranged matrix with a finer-grained sparsity pattern that is more suitable for the performance of the matrix operation accelerator may be produced. Moreover, the result of a matrix operation performed by the matrix operation accelerator on the rearranged matrix may be rearranged to produce a result matrix corresponding to the original matrix (e.g., to the original arrangement of the matrix). To that end, the final result of the matrix operation may remain unaffected by the rearranging of the rows and/or columns of an input matrix.

With the foregoing in mind, FIG. 1 illustrates a block diagram of a processing system 10, such as a processor and/or components of a processor, that may implement machine learning (ML) and/or deep learning (DL) operations (e.g., matrix operations). As illustrated, memory 12, such as random-access memory (RAM), read-only memory (ROM), and/or non-volatile storage circuitry, flash memory, or the like, may store matrix multiplication instructions 14. In some embodiments, as described in greater detail below, the matrix multiplication instructions 14 may correspond to instructions to efficiently perform sparse GeMM operations. Further, the processing system 10 may include fetch and decode circuitry 16. In some embodiments the fetch and decode circuitry 16 may fetch the matrix multiplication instructions 14 from the memory 12 and may decode the fetched instructions into one or more operations. For example, in some embodiments, decoding the matrix multiplication instructions 14 may involve decoding the matrix multiplication instructions 14 into a number of operations and/or instructions suitable to be executed by a matrix operation accelerator 26 (e.g., execution circuitry). Accordingly, the matrix operation accelerator 26 of the processing system 10 may be communicatively coupled to the fetch and decode circuitry 16. For instance, in some embodiments, routing circuitry 20 may communicatively couple the matrix operation accelerator 26 to the fetch and decode circuitry 16. Moreover, the processing system 10 may include write back circuitry 30, which may commit a result produced by the matrix operation accelerator 26 to memory 12, for example.

In some embodiments, the matrix operation accelerator 26 (e.g., dot-product circuitry) may be implemented to perform dot-product and/or machine learning operations using logic and/or circuitry, as described in greater detail below. Further, the matrix operation accelerator 26 may be implemented to include or may be communicatively coupled to control logic 28. The control logic 28 may be implemented to include circuitry and/or logic, such as a state machine, a controller, one or more processors, and/or the like, suitable to enable communication with and/or to control the matrix operation accelerator 26. For example, the control logic 28 may instruct the matrix operation accelerator 26 to perform certain operations based in part on the decoded instructions received from the fetch and decode circuitry 16 and/or based in part on a configuration of the control logic 28.

The components described above with regard to the processing system 10 are exemplary components. To that end, the processing system 10 may include additional or fewer components compared to those shown. Additionally, it may be appreciated that the functional blocks described herein may be implemented with any suitable combination of hardware and software. Moreover, in some embodiments, the fetch and decode circuitry 16 may be implemented as distinct fetch circuitry and distinct decode circuitry. Similarly, while the control logic 28 is illustrated as a component of the matrix operation accelerator, the control logic 28 may be implemented as a separate component or combination of components in the processing system 10. Further, the routing circuitry may be implemented external to the matrix operation accelerator 26, as a component of the matrix operation accelerator 26, or a combination thereof. Thus, embodiments described herein are intended to be illustrative and not limiting.

Figure 2:
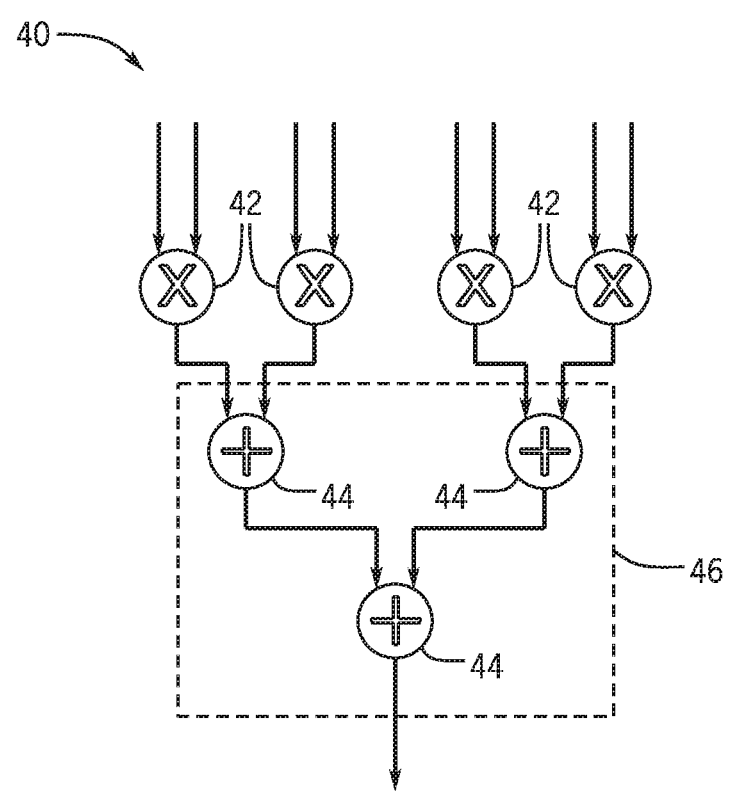
FIG. 2 is a block diagram of multiply-accumulate (MAC) circuitry, in accordance with an embodiment.

FIG. 2 illustrates an embodiment of multiply-accumulate (MAC) circuitry 40, which may be included in the matrix operation accelerator 26. As shown in the illustrated embodiment, the MAC circuitry 40 may include a set of multipliers 42 (e.g., multiplier circuitry), as well as a set of adders 44 (e.g., adder circuitry), which may be arranged in an adder tree 46. Accordingly, the MAC circuitry 40 may be implemented to perform matrix operations, such as matrix multiplication. To that end, the matrix operation accelerator 26 may include the MAC circuitry 40 and may perform matrix multiplication.

Figure 3:
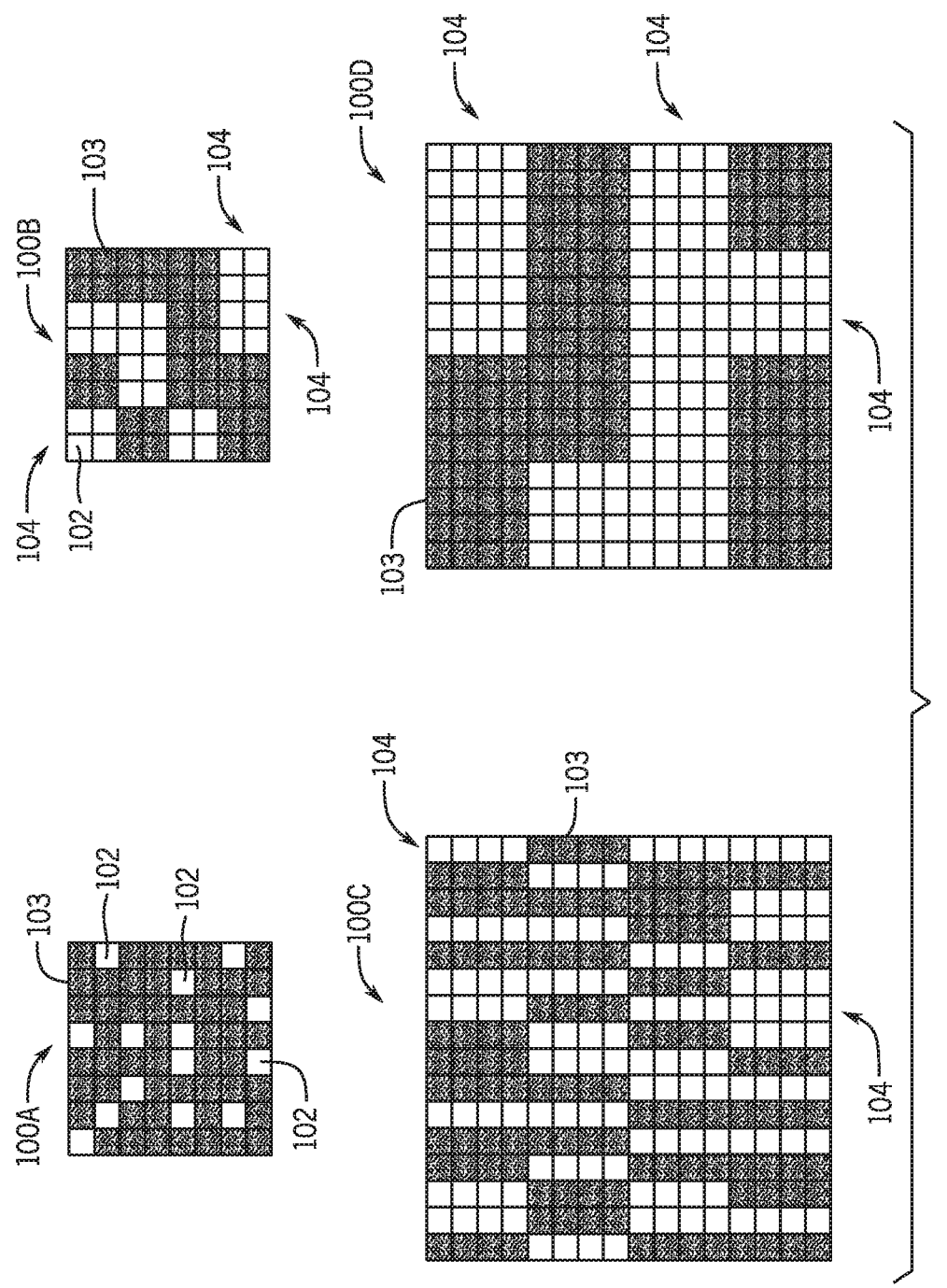
FIG. 3 is a block diagram of examples of matrices with different sparsity, in accordance with an embodiment.

Turning now to FIG. 3, a matrix may be implemented with one or more of many different patterns of sparsity based in part on the pattern (e.g., distribution) and the proportion of null and/or zero elements in the matrix relative to the non-zero elements in the matrix. For instance, as described above, a matrix may include a fine-grained sparsity (e.g., unstructured sparsity), a block sparsity (e.g., structured sparsity), or the like. To help illustrate, block diagrams of a number of matrices 100 with different respective sparsity patterns are shown in FIG. 3. For example, the first matrix 100A illustrates an example of a matrix with fine-grained sparsity, as the null elements 102 (e.g., zero and/or null elements) are relatively isolated from one another by non-zero elements 103. Further, the second matrix 100B illustrates an example of a matrix with 2×2 block sparsity. To that end, the second matrix 100B includes null blocks 104 that are two null elements 102 wide and two null elements 102 tall. Moreover, the third matrix 100C illustrates an example of a matrix with 4×1 block sparsity, as the third matrix 100C includes null blocks 104 that are one null element 102 wide and four null elements 102 tall. The fourth matrix 100D, which includes null blocks 104 that are four null elements 102 wide and four null elements 102 tall, illustrates an example of a matrix with 4×4 block sparsity. Additionally, while four sparsity patterns (e.g., fine-grained, 2×2 block sparsity, 4×1 block sparsity, and 4×4 block sparsity) are illustrated, it may be appreciated that matrices may be implemented with other sparsity patterns (e.g., 8×1, 8×8, 16×1, and/or the like). Thus, embodiments described herein are intended to be illustrative and not limiting.

In some embodiments, to improve performance (e.g., latency) and power efficiency of the processing system 10, matrix operation accelerators 26, such as deep learning matrix operation accelerators, may be implemented to support improved (e.g., optimized) processing of sparse general matrix multiplication (GeMM). More specifically, in some embodiments, a matrix operation accelerator 26 may be implemented to optimize processing of a certain set of sparsity patterns, such as unstructured sparsity (e.g., fine-grained sparsity) or structured sparsity (e.g., block-sparsity). However, in some embodiments, hardware and/or logic optimizations suitable for a first sparsity pattern may not be suitable for a second sparsity pattern. For example, to perform matrix operations using an input matrix with fine-grained sparsity, the matrix operation accelerator 26 may be implemented to locate opportunities to move computation to unused multipliers (e.g., multiplication circuitry) using a sliding window. Because the null elements 102 of block sparsity patterns may be located in null blocks 104 (e.g., clusters), however, this technique may not be suitable in terms of resulting performance metrics (e.g., speed, power, and/or the like) for matrices without fine-grained sparsity.

Figure 4:
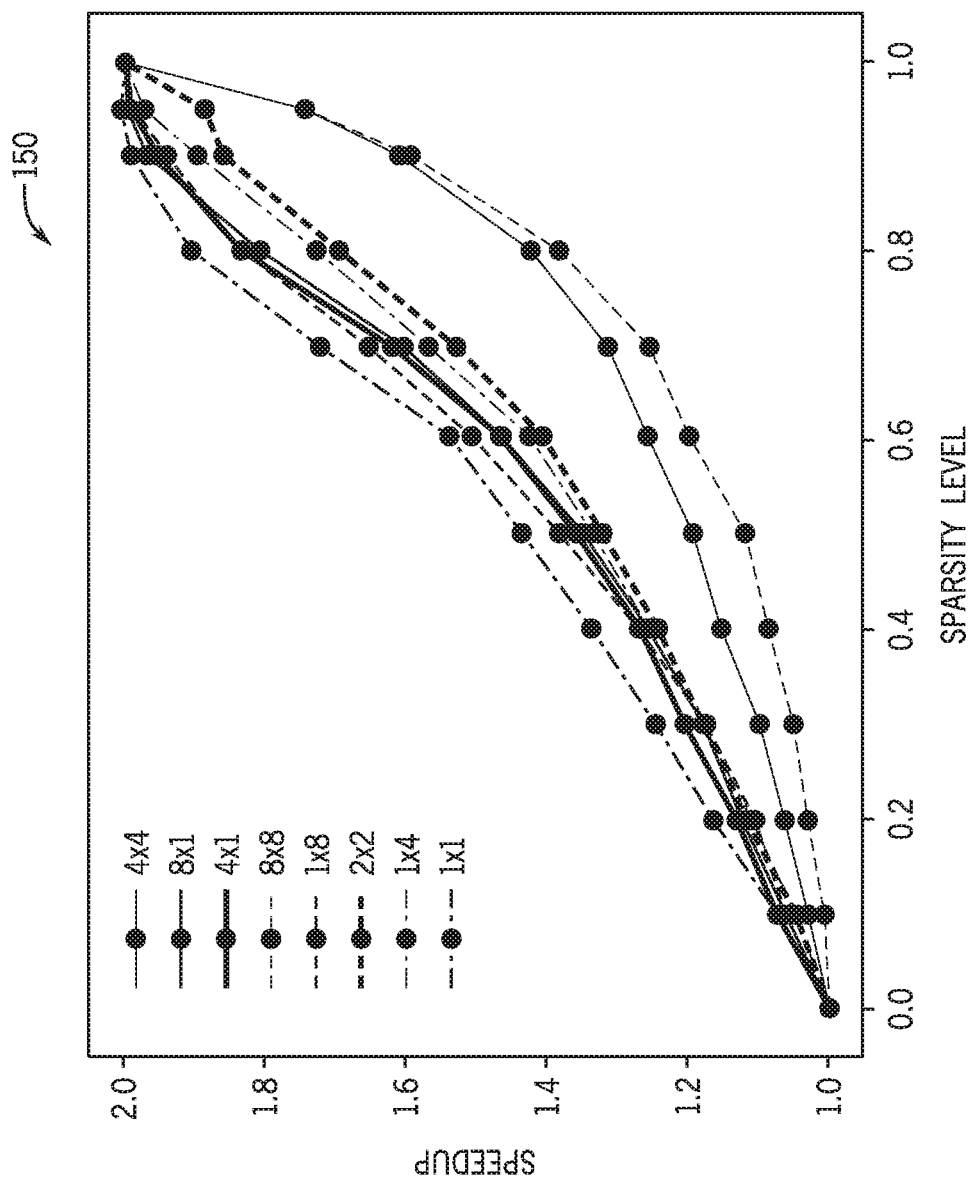
FIG. 4 is a plot of performance speedup of a hardware accelerator as a function of input matrix sparsity levels, in accordance with an embodiment.

To help illustrate, an example plot 150 of the performance speedup of a matrix operation accelerator 26 designed (e.g., optimized) to perform operations on a matrix with fine-grained sparsity as a function of the sparsity level of a matrix input to the matrix operation accelerator 26 is shown in FIG. 4. As illustrated, the matrix operation accelerator 26 produces the greatest performance speedup with matrices implemented with the most fine-grained sparsity patterns (e.g., 1×1 sparsity). In contrast, for matrices implemented with more structured sparsity patterns (e.g., 4×4 block sparsity, 8×8 block sparsity, and/or the like), the matrix operation accelerator produces the lowest relative performance speedup. In some embodiments, to account for the performance (e.g., speed, latency, efficiency, and/or the like) differences across operations involving matrices implemented with different sparsity patterns, the matrix operation accelerator 26 may be implemented with additional circuitry and/or logic designed (e.g., optimized) to perform operations using more structured sparsity patterns. Moreover, as the number of sparsity patterns the matrix operation accelerator 26 is designed (e.g., optimized) to handle increases, the hardware used to implement the matrix operation accelerator 26 may increase. For instance, in some embodiments, a first matrix operation accelerator 26 may be used to perform operations using matrices with a first sparsity pattern, while a second matrix operation accelerator 26 may be used to perform operations using matrices with a second sparsity pattern. To that end, designing (e.g., optimizing) a matrix operation accelerator 26 to perform high-performance (e.g., higher-efficiency) operations on a number of different sparsity patterns may be costly to implement in terms of resources (e.g., hardware, area, routing, computing efficiency, and/or the like).

To avoid these costs, in some embodiments, the rows and/or columns of an input matrix may be rearranged (e.g., reordered), which may alter the sparsity of the matrix to match a sparsity for which the matrix operation accelerator 26 is designed (e.g., optimized) to handle. For example, as illustrated, by scrambling the order of the columns of an original matrix 160 implemented with 4×4 block sparsity, the original matrix 160 may be converted to a rearranged matrix 180 implemented with 4×1 block sparsity. In some embodiments, the order of the rows and/or columns of the original matrix 160 may be determined by the order the elements of the original matrix 160 are read (e.g., retrieved) from memory 12. Additionally or alternatively, order of the rows and/or columns of the original matrix 160 may be determined based in part on a data structure implemented to store the original matrix 160 and/or an order the elements of the original matrix 160 are stored within memory 12. Accordingly, by altering the order the elements of the original matrix 160 are read from memory 12 or by altering the order the elements of the original matrix 160 are received at and/or used by the matrix operation accelerator 26, the rows and/or columns of the original matrix 160 may be rearranged, and the rearranged matrix 180 may be produced. For instance, in the illustrated embodiment, a stride of four is used in reading the elements of the matrix 100D by reading every fourth column from memory 12 until each column is read (e.g., column indices 0, 4, 8, and 12, followed by column indices 1, 5, 9, and 13, followed by column indices 2, 6, 10, 14, followed by column indices 3, 7, 11, 15, and so on) and the rearranged matrix 180 is produced.

Figure 6:
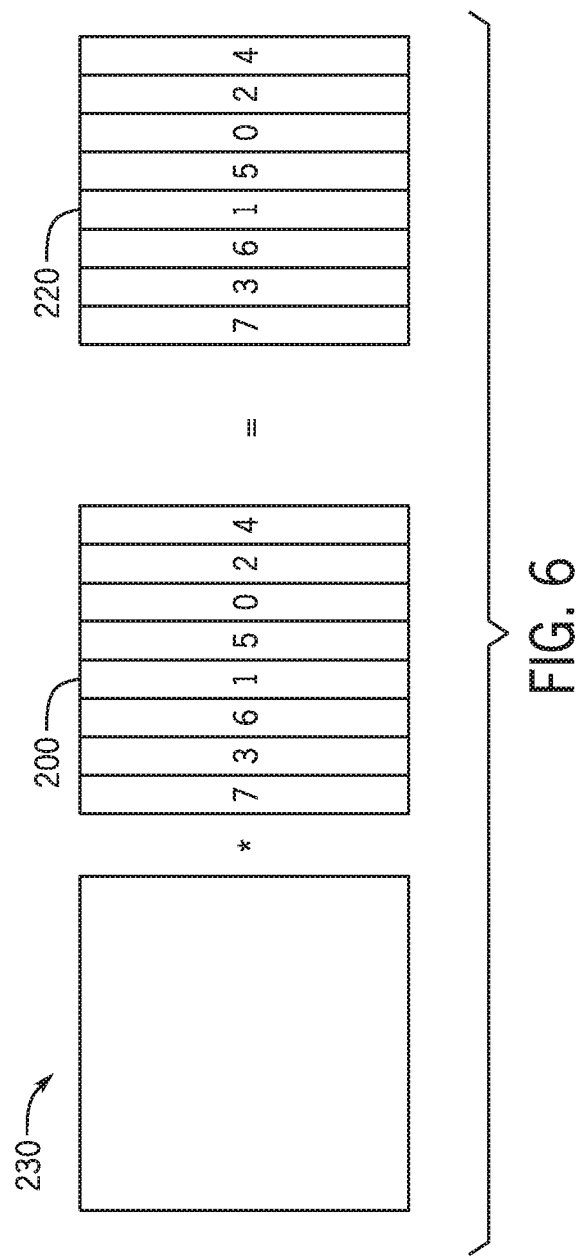
FIG. 6 is a block diagram of a matrix operation that involves a rearranged matrix, in accordance with an embodiment.

Moreover, as illustrated in FIG. 6, the order of the rows and/or columns of matrices that are operands to a matrix operation (e.g., matrix multiplication) may impact the location of elements, such as inner-products, in the matrix resulting from the operation. For example, by scrambling (e.g., rearranging) the columns of a matrix 200 input to a matrix multiplication (e.g., dot-product computation), the columns of the result matrix 220 may be rearranged. That is, for example, an inner-product corresponding to a column having a particular index in the matrix 200 may be located in a column having the same index in the matrix 220. Moreover, if the column index is changed from a first number to a second number in the matrix 200, the column index corresponding to the inner-product in the matrix 220 will change from the first number to the second number. Accordingly, in some embodiments, the logic used to rearrange the columns of the input matrix 200 may be reversed to rearrange the result matrix 220. For instance, the rows and/or columns of the result matrix 220 may be written to memory 12 in an order opposite the order used to read the input matrix 200 such that the result stored in memory 12 corresponds to the result that the matrix 200 would have produced before it was rearranged. To that end, rearranging the input matrix 200 and the result 220 using equal but opposite techniques may not affect the result of the matrix operation.

Further, it may be appreciated that in matrix multiplication of a first matrix 230 and a second matrix 200, the first matrix 230, the result matrix 220, or both may be rearranged and the same inner-product terms (e.g., matrix elements) as the inner-product terms resulting from multiplication of the first matrix 230 and the second matrix 200 without any rearrangement may be produced. Accordingly, in some embodiments, the rows of the first matrix 230, the columns of the second matrix 200, or a combination thereof may be rearranged. Additionally or alternatively, the columns of the first matrix 230 and the rows of the second matrix 200 may be rearranged. In some embodiments, however, the location of the inner-product terms in the result matrix 220 may vary based on the rearrangement of the rows and/or columns of the first matrix 230 and/or the second matrix 200.

Figure 7:
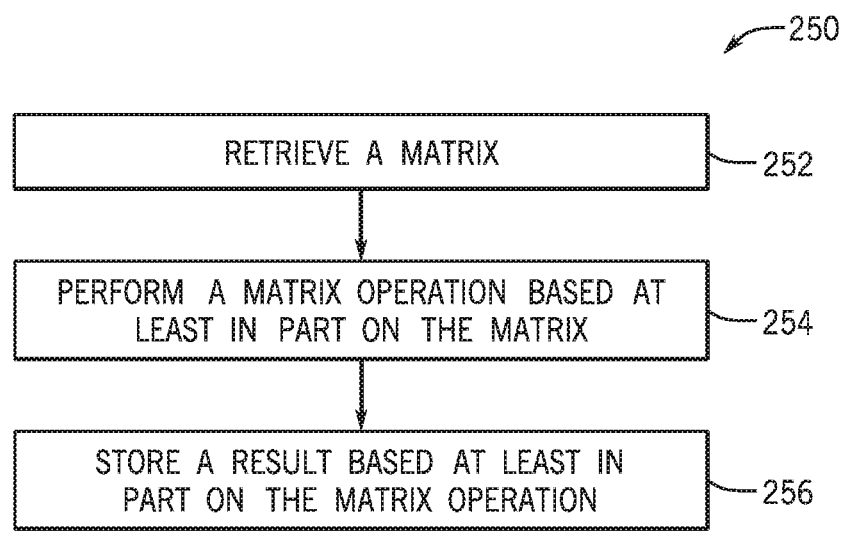
FIG. 7 is a flow chart of a process for performing matrix operations across a variety of sparsity patterns using a hardware accelerator designed (e.g., optimized) for a particular sparsity pattern, in accordance with an embodiment.

With the foregoing in mind, FIG. 7 illustrates a flowchart of a method 250 for performing high-performance matrix operations across a variety of sparsity patterns using a matrix operation accelerator designed (e.g., optimized) for unstructured sparsity patterns, in accordance with embodiments described herein. Although the description of the method 250 is described in a particular order, which represents a particular embodiment, it should be noted that the method 250 may be performed in any suitable order, and steps may be added or omitted. Moreover, the method 250 may be performed by the processing system 10, the matrix operation accelerator 26, the control logic 28, or any suitable combination thereof.

The method 250 may be initiated by a retrieving a matrix (process block 252). In some embodiments, for example, the matrix may be stored in memory 12 (e.g., storage circuitry, a random-access memory (RAM), a read-only memory (ROM), and/or the like). Additionally or alternatively, the matrix may be stored in a memory device external to the processing system 10, such as a dynamic random-access memory (DRAM) device, a synchronous DRAM device, and/or the like. As such, the matrix may be retrieved (e.g., read, accessed, and/or received) from the memory 12. Moreover, in some embodiments, the matrix may be retrieved based at least in part on the matrix multiplication instructions 14. For instance, the matrix multiplication instructions 14 may specify that the matrix is an operand for a matrix multiplication to be performed. The matrix multiplication instructions 14 may additionally specify an address of the matrix in memory 12. More specifically, in some embodiments, the instructions 14 may include information regarding the arrangement of the elements (e.g., the rows and/or the columns) of the matrix in memory 12, as described in greater detail below. Further, in some embodiments, the control logic 28 may control the retrieval of the matrix.

Figure 5:
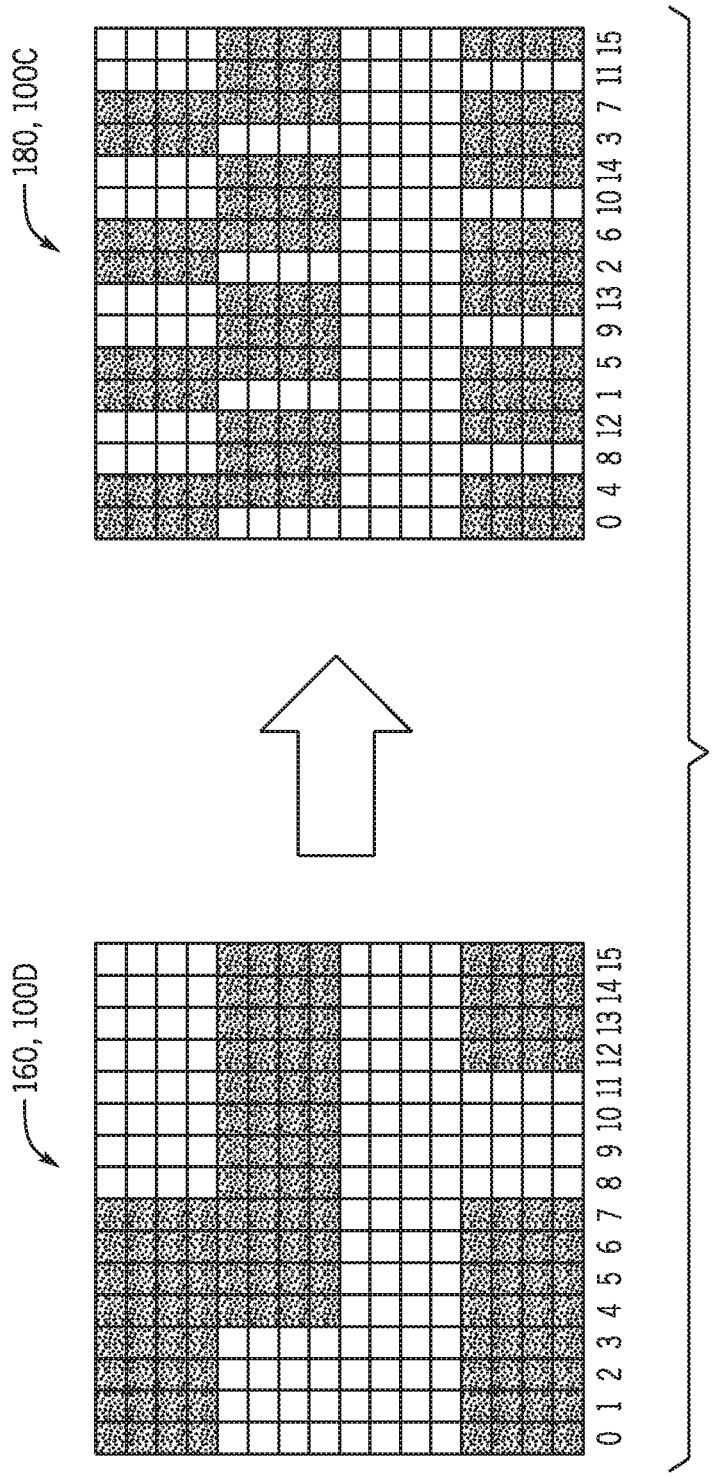
FIG. 5 is a block diagram of an example of an original matrix and a rearranged matrix, in accordance with an embodiment.

In some embodiments, the matrix may be retrieved as a rearranged matrix. That is, for example, the rows and/or columns of the matrix may be retrieved in a different order than the chronological order of the rows and/or columns of the original matrix design stored in memory 12. Accordingly, in some embodiments, for example, the control logic 28 may be implemented to retrieve the matrix in a random order, using a particular stride, and/or the like. More specifically, in some embodiments, a stride of four may be used to retrieve every fourth column of the matrix, as illustrated in FIG. 5. For example, after a first set of columns are retrieved (e.g., column indices 0, 4, 8, and 12), a second set of columns (e.g., column indices 1, 5, 9, and 13) may be retrieved. However, in some cases, the difference between the index of the final column (12) in the first set of columns and the index of the first column (1) in the second set of columns may vary from the stride. Accordingly, the stride may be adjusted between sets of columns so that each column in the matrix is retrieved. On the other hand, in some embodiments, the stride may be selected as coprime relative to the total number of columns in the matrix. As such, the stride may remain constant as each set of columns is retrieved.

In some embodiments, the control logic 28 may be implemented to retrieve the rows and/or columns of a matrix using a particular pattern and/or stride. That is, for example, the control logic 28 may be initialized with the pattern and/or the stride. Additionally or alternatively, the control logic 28 may be implemented to select a pattern and/or stride suitable to rearrange the rows and/or columns of a matrix during retrieval based in part on the size of the matrix, the sparsity of the matrix, currently available resources (e.g., time, power, and/or the like) in the processing system 10, and/or the like. Moreover, in some embodiments the pattern and/or stride used to retrieve the rows and/or columns of the matrix may be selectable (e.g., programmable). For example, in some embodiments, the control logic 28 may be implemented to retrieve the rows and/or columns of a matrix using a pattern and/or stride determined based in part on an input received at the processing system 10 (e.g., via an input structure, such as a keyboard, mouse, touch-screen display, and/or the like).

Moreover, in some embodiments, the control logic 28 may be implemented to retrieve the matrix in a particular order based at least in part on the matrix multiplication instructions 14. For example, in some embodiments, fetch and decode circuitry 16 may provide operations based on the matrix multiplication instructions 14 that are implemented to cause the control logic 28 to retrieve the matrix in a particular order. Additionally or alternatively, the control logic 28 may be implemented to retrieve the matrix based on an alternate order than an order specified by the matrix multiplication instructions 14. For instance, in certain embodiments, the ordering of the matrix specified in the matrix multiplication instructions 14 may correspond to the original design of the matrix. Accordingly, the control logic 28 may be implemented to, in response to determining the original design of the matrix corresponds to a structured sparsity, retrieve the matrix in an order such that a rearranged matrix is produced. Moreover, in some embodiments, the control logic 28 may be implemented to retrieve the matrix with the original matrix design. In such embodiments, the control logic 28 may store the matrix in memory and/or a storage location communicatively coupled to the matrix operation accelerator 26 and/or included in the matrix operation accelerator 26, such as a data buffer within the matrix operation accelerator 26. Subsequently, the control logic 28 may determine the matrix includes a structured sparsity and, in response to determining the matrix includes a structured sparsity, the control logic 28 may deliver elements of the matrix in a rearranged order to the matrix operation accelerator 26. In some embodiments, for example, delivering elements of the matrix to the matrix operation accelerator 26 in a rearranged order may involve reconfiguring the routing circuitry 20.

After the matrix is retrieved, the method 250 may proceed with a matrix operation being performed with the matrix (process block 254). For instance, the matrix operation accelerator 26 may use the matrix, which, as described above, may be rearranged before delivery to the matrix operation accelerator 26, as an operand of a matrix multiplication (e.g., dot-product operation). Moreover, as discussed above, one or more of the operands of the matrix operation may include rearranged rows and/or columns.

The method 250 may proceed with a result (e.g., a result matrix) being stored based at least in part on the matrix operation (process block 256). In some embodiments, for example, the write back circuitry 30 may commit the result to a storage location, such as memory 12. Further, in some embodiments the result committed by the write back circuitry may differ from the output of the matrix operation. That is, for example, because the matrix input to the matrix operation may be a rearranged matrix, the output of the matrix operation may be a rearranged result matrix. Accordingly, the output of the matrix operation may be rearranged prior to and/or during storage of the result. To that end, rearranging the output of the matrix operation may involve storing (e.g., writing) the rows and/or columns of a result matrix to a storage location, such as memory 12, in a different order than the rows and/or columns are produced by the matrix operation.

More specifically, in some embodiments, the control logic 28 may be implemented to write and/or store the rows and/or columns of the result matrix by in an order opposite the order used to retrieve the rearranged matrix. To that end, the result matrix may be restored to the matrix design that would have resulted from the matrix operation if the input matrix was not rearranged. Moreover, to rearrange the output of the matrix operation, the control logic 28 may maintain a mapping of the rearrangements made to the input matrices of the matrix operation. As such, the control logic 28 perform the operations inverse to those in the mapping to rearrange the result matrix. Further, it may be appreciated that in some embodiments, the control logic 28 may instruct the write back circuitry 30 to rearrange the output of the matrix operation to store the result. Moreover, as described above, subsequent to rearranging the output of the matrix operation, the control logic 28 may store the output of the matrix operation in, for example, a data buffer of the matrix operation accelerator 26. As additionally described above, the control logic 28 may be implemented to rearrange the output of the matrix operation based in part on the matrix multiplication instructions 14 and/or based at least in part on a configuration of the control logic 28.

Figure 8:
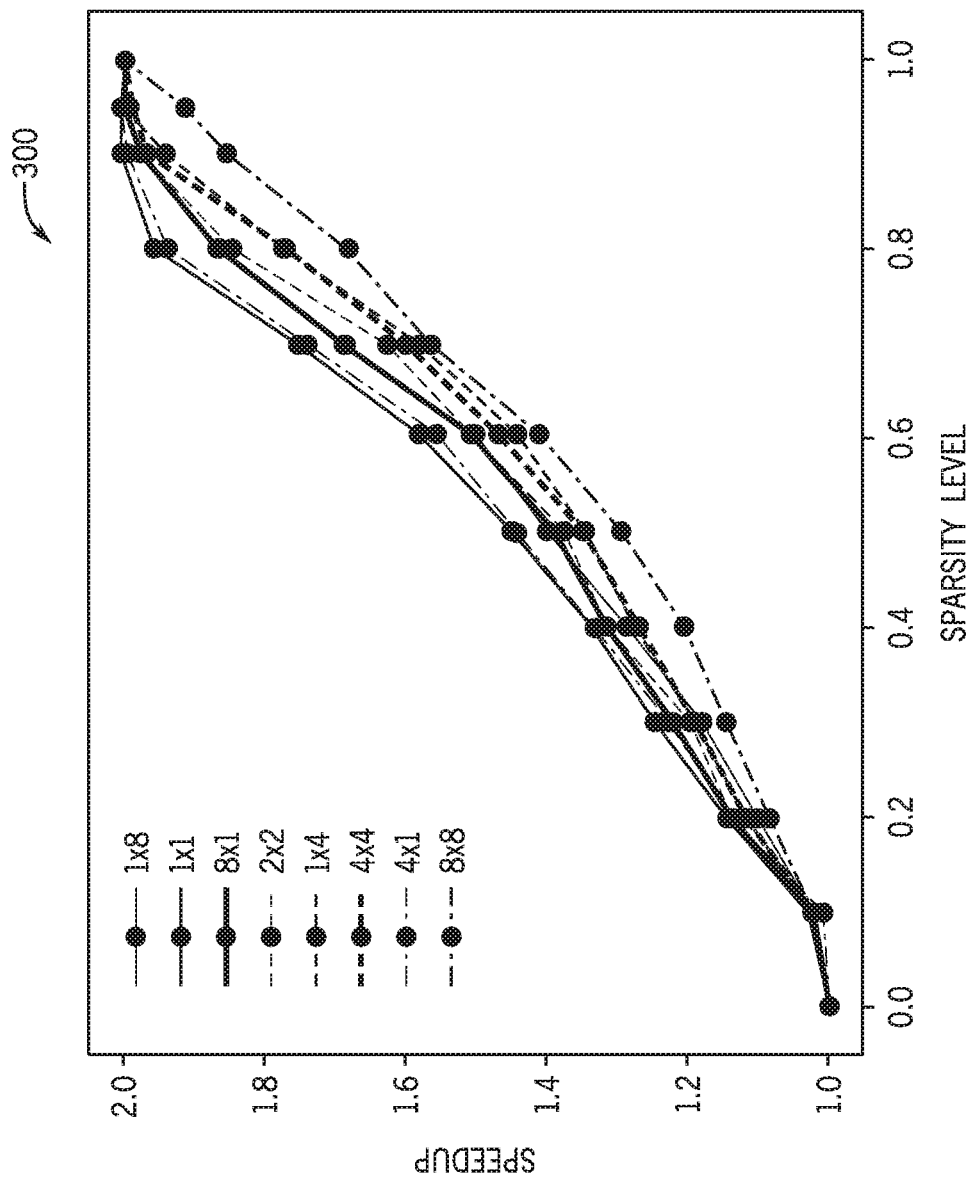
FIG. 8 is a plot of performance speedup of a hardware accelerator as a function of input matrix original sparsity levels, in accordance with an embodiment.

FIG. 8 illustrates an example of a plot 300 of the performance improvement of the matrix operation accelerator 26 designed (e.g., optimized) to perform operations on a matrix with fine-grained sparsity as a function of the sparsity level of a matrix input to the matrix operation accelerator 26. More specifically, the plot 300 illustrates the performance speedup of the matrix operation accelerator 26 as a function of the original sparsity level of a matrix that is rearranged to have a different sparsity level, according to the techniques described herein, before being input to the matrix operation accelerator 26. As illustrated and in comparison with plot 150 of FIG. 4, in some embodiments, the discrepancy between performance speedup associated with matrices with different sparsity is reduced by rearranging the matrices before they are input to the matrix operation accelerator 26, as described herein. Accordingly, by reading an input matrix in a rearranged order, the hardware and/or resources (e.g., time, area, fabrication costs, and/or the like) involved with implementing the matrix operation accelerator 26 to provide certain performance metrics (e.g., latency, power, efficiency, and/or the like), may be reduced.

Figure 9:
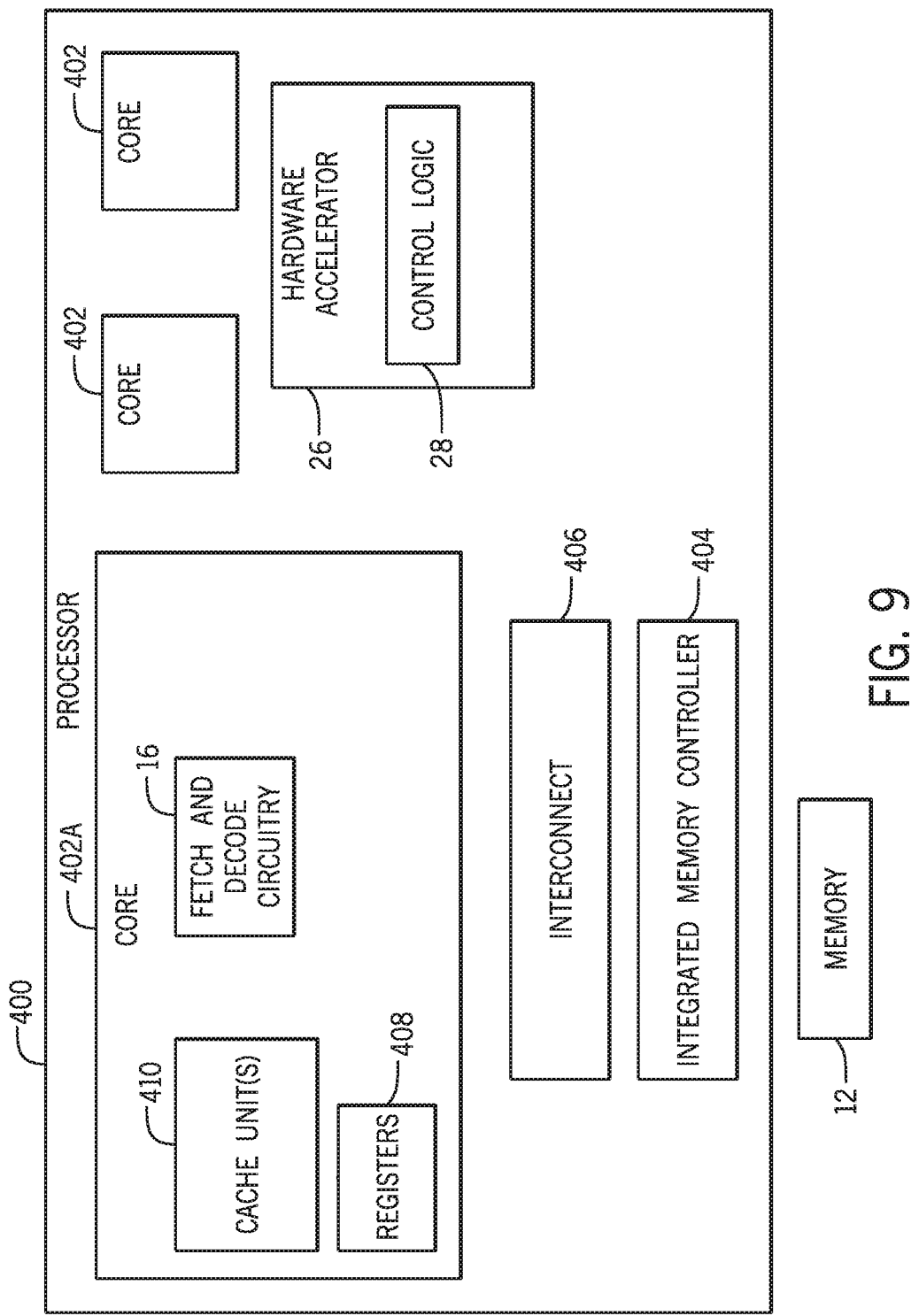
FIG. 9 is block diagram of a processor, in accordance with an embodiment.

Further, as described herein, the processing system 10 may be or may be a component of a processor 400, as illustrated in FIG. 9. As illustrated, in some embodiments, the processor 400 may include one or more cores 402 (e.g., processing cores), an integrated memory controller 404, interconnect circuitry 406 and/or logic, which may include the routing circuitry 20, and/or the like. In some embodiments, the cores 402 may be multithreaded cores, which may be implemented to concurrently execute multiple instruction threads. Further, while three cores 402 are shown in the illustrated embodiment, any suitable number of cores (e.g., 1, 2, 4, 5, or more) may be included in the processor 400. Moreover, it may be appreciated that each of the cores 402 may include common components, such as the fetch and decode circuitry 16, the registers 408, and/or the cache units 410 illustrated in the core 402A, or may include different circuitry. For instance, a first set of the cores 402 may be high performance and/or high power cores, while a second set of the cores 402 may be low performance and/or low power cores.

As further illustrated, the matrix operation accelerator 26 may be communicatively coupled to the cores 402 via the interconnect circuitry 406, such as an in-die interconnect. Accordingly, as described herein, the fetch and decode circuitry 16 may decode instructions to be executed by the matrix operation accelerator 26 and may transmit the decoded instructions to the matrix operation accelerator 26 via the interconnect circuitry 406. Additionally or alternatively, the matrix operation accelerator may include the fetch and decode circuitry 16. Moreover, after executing the instructions, the matrix operation accelerator 26 may store the results to the region in memory 12 (e.g., system memory), which may also be accessible to the cores 402. Furthermore, in some embodiments, the matrix operation accelerator 26 may additionally or alternatively be located on a chip separate from the chip containing the cores 402. In such embodiments, the cores 402 may be coupled to the matrix operation accelerator 26 via interconnect circuitry 406 and/or an interface between the chips.

The processor 400 may also include an integrated memory controller 404. In some embodiments, the integrated memory controller 404 may provide access to the memory 12. Further, the cores 402 and/or the matrix operation accelerator 26 may include a number of different registers 408. The registers may include, for example, general purpose registers, control registers, data registers, instruction pointer registers, and/or the like. In some embodiments, the control registers may store control bits (e.g., flags), which may reflect a state of a core 402 and/or another component of the processor 400.

As described herein, embodiments are intended to be illustrative and not limiting. Accordingly, it may be appreciated that the components described above with regard to the processor 400 are exemplary components. For example, in some embodiments, the processor 400 may be implemented as a graphics processing unit (GPU), a vector processing unit (VPU), a microprocessor, a microcontroller, an application specific integrated circuit (ASIC), a digital signal processor (DSP), and/or the like. To that end, the processor 400 may include additional or fewer components compared to those shown.

Moreover, in some embodiments, the processor 400 may be included in a computer architecture and/or a system, such as a computing device (e.g., a computer, a mobile device, a tablet, and/or the like). For instance, in some embodiments, the processor 400 may be included in a system with multiple other processors 400 (e.g., co-processors). Additionally or alternatively, the processor may be included in a system on chip (SoC) integrated circuit design.

Embodiments of the techniques disclosed herein may be implemented in hardware, software, firmware, or a combination thereof. Moreover, the techniques described herein may be implemented as computer programs or program code (e.g., machine-readable code), which may be implemented by a processing system, such as a system that includes at least one processor, a storage system (e.g., volatile memory, non-volatile memory, storage circuitry, and/or the like), and/or the like. In some embodiments, the program code may be implemented in a high level or object oriented programming language. Moreover, the program code may be implemented in assembly or machine language. To that end, any suitable program code may be used.

Further, embodiments described herein may be implemented by representative instructions and/or hardware description language (HLD) stored on a machine-readable medium which represents various logic within the processor. The representative instructions, when read by a machine, may cause the machine to fabricate logic to perform the techniques described herein. The representative instructions may be stored on a tangible, machine readable medium and may be executed to fabricate and/or configure logic and/or circuitry. In some embodiments, the machine-readable storage media may include, non-transitory, tangible arrangements of articles manufactured or formed by a machine or device. For instance, the machine-readable storage media may include storage media such as hard disks, floppy disks, optical disks, compact disk read-only memories (CD-ROMs), compact disk rewritable's (CD-RWs), magneto-optical disks, and/or the like. Additionally or alternatively, the machine-readable storage media may include a semi-conductor device, such as a read-only memory (ROM), a random access memory (RAM) (e.g., dynamic random access memory (DRAM), static random access memory (SRAMs), and/or the like), erasable programmable read-only memory (EPROM), flash memory, electrically erasable programmable read-only memory (EEPROM), phase change memory (PCM), magnetic or optical cards, or another suitable medium.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
   matrix operation accelerator circuitry configured to perform a matrix operation on a first matrix having a first sparsity and output a result matrix based at least in part on the matrix operation; and
   control logic circuitry communicatively coupled to the matrix operation accelerator circuitry and a memory, wherein the control logic circuitry is configured to:
   access a second matrix having a second sparsity in the memory, wherein the second matrix comprises a first plurality of columns arranged in a first order;
   rearrange the first plurality of columns from the first order to a second order to generate the first matrix having the first sparsity;
   rearrange a second plurality of columns of the result matrix from a third order to a fourth order corresponding to the first order to generate a third matrix having the second plurality of columns arranged in the fourth order; and
   store the third matrix in the memory.

2. The system of claim 1, wherein the first sparsity is finer-grained than the second sparsity.

3. The system of claim 1, wherein the matrix operation accelerator circuitry is configured to perform matrix operations on matrices of the first sparsity but not the second sparsity.

4. The system of claim 1, wherein the control logic circuitry comprises one or more processors.

5. The system of claim 1, wherein the second order comprises a coprime stride.

6. The system of claim 1, wherein the control logic circuitry is configured to retrieve the first matrix in the first order, wherein retrieving the first matrix comprises rearranging the first plurality of columns from the first order to the second order based at least in part on an input provided to the system.

7. The system of claim 1, wherein the control logic circuitry is configured to determine the second order based at least in part on a characteristic of the second matrix.

8. The system of claim 7, wherein the characteristic comprises a size of the second matrix, a sparsity of the second matrix, or a combination thereof.

9. The system of claim 1, comprising decode circuitry, wherein the control logic circuitry is configured to retrieve the first matrix from memory in response to receiving a decoded instruction via the decode circuitry.

10. The system of claim 1, wherein the system comprises a processor.

11. The system of claim 1, wherein rearranging the first plurality of columns from the first order to the second order to generate the first matrix having the first sparsity comprises reading the second matrix from the memory according to a mapping such that the first plurality of columns are read in the second order.

12. A method, comprising:
    accessing, via control logic circuitry, a first matrix having a first plurality of columns arranged in a first order from a storage location;
    rearranging, via the control logic circuitry, the first plurality of columns from the first order to a second order to generate a second matrix;
    generating, via matrix operation accelerator circuitry, a result matrix based at least in part on a matrix operation and the second matrix, wherein the result matrix comprises a second plurality of columns arranged in a third order;
    rearranging, via the control logic circuitry, the second plurality of columns of the result matrix from the third order to a fourth order corresponding to the first order to generate a third matrix having the second plurality of columns arranged in the fourth order; and
    storing the third matrix in the storage location.

13. The method of claim 12, wherein the matrix operation comprises a matrix multiplication of the second matrix and a fourth matrix.

14. The method of claim 13, comprising:
accessing, via the control logic circuitry, a fifth matrix from a second storage location, wherein the fifth matrix comprises a first plurality of rows arranged in a fifth order; and
rearranging, via the control logic circuitry, the first plurality of rows from the fifth order to a sixth order to generate the fourth matrix.

15. The method of claim 12, comprising determining the fourth order based at least in part on the first order.

16. The method of claim 12, wherein the second order comprises a randomization of the first order.

17. A tangible, non-transitory, machine-readable medium, comprising machine-readable instructions that, when executed by one or more processors, cause the one or more processors to perform operations comprising:
configuring a matrix operation accelerator to perform a matrix operation on a first matrix and output a result matrix based at least in part on the matrix operation; and
configuring control logic circuitry communicatively coupled to the matrix operation accelerator and to a memory to:
access a second matrix in the memory, wherein the second matrix comprises a first plurality of columns arranged in a first order;
rearrange the first plurality of columns from the first order to a second order to generate the first matrix; rearrange a second plurality of columns of the result matrix from a third order to a fourth order corresponding to the first order to generate a third matrix having the second plurality of columns arranged in the fourth order; and
store the third matrix in the memory.

18. The tangible, non-transitory, machine-readable medium of claim 17, wherein the memory comprises a dynamic random-access memory (DRAM).

19. The tangible, non-transitory, machine-readable medium of claim 17, wherein configuring the matrix operation accelerator comprises:
configuring the matrix operation accelerator to, with a first latency, perform matrix operations using a matrix having a first sparsity; and
configuring the matrix operation accelerator to, with a second latency different from the first latency, perform the matrix operations using a matrix having a second sparsity.

20. The tangible, non-transitory, machine-readable medium of claim 17, wherein configuring the matrix operation accelerator comprises:
configuring the matrix operation accelerator to, using a first power, perform matrix operations using a matrix having a first sparsity; and
configuring the matrix operation accelerator to, using a second power different from the first power, perform the matrix operations using a matrix having a second sparsity.

* * * * *